United States Patent
Sylvain

(10) Patent No.: US 7,496,192 B1
(45) Date of Patent: Feb. 24, 2009

(54) INTERWORKING OF MULTIMEDIA AND TELEPHONY EQUIPMENT

(75) Inventor: Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 813 days.

(21) Appl. No.: 10/726,905

(22) Filed: Dec. 3, 2003

Related U.S. Application Data

(60) Provisional application No. 60/434,937, filed on Dec. 20, 2002.

(51) Int. Cl.
*H04M 7/00* (2006.01)
*H04L 12/66* (2006.01)

(52) U.S. Cl. ............ 379/221.01; 379/219; 379/220.01; 370/352; 370/354

(58) Field of Classification Search ............ 379/221.01, 379/219, 220.01; 370/352, 355, 466, 354, 370/356; 709/204; 348/14.01; 455/445
See application file for complete search history.

(56) References Cited

U.S. PATENT DOCUMENTS

| | | | |
|---|---|---|---|
| 5,742,670 A | 4/1998 | Bennett | 379/142 |
| 5,978,681 A * | 11/1999 | Bertacchi | 455/445 |
| 6,324,280 B2 | 11/2001 | Dunn et al. | |
| 6,333,928 B1 | 12/2001 | Schaal et al. | 370/360 |
| 6,366,577 B1 | 4/2002 | Donovan | 370/352 |
| 6,426,942 B1 | 7/2002 | Sienel et al. | 370/235 |
| 6,426,950 B1 * | 7/2002 | Mistry | 370/352 |
| 6,430,174 B1 | 8/2002 | Jennings et al. | 370/352 |
| 6,430,176 B1 | 8/2002 | Christie, IV | 370/355 |
| 6,560,329 B1 | 5/2003 | Draginich et al. | |
| 6,564,261 B1 | 5/2003 | Gudjonsson et al. | 709/227 |
| 6,614,781 B1 * | 9/2003 | Elliott et al. | 370/352 |
| 6,674,457 B1 * | 1/2004 | Davies et al. | 348/14.01 |
| 6,810,036 B1 * | 10/2004 | Dang et al. | 370/356 |
| 6,868,140 B2 | 3/2005 | Myers et al. | 379/67.1 |
| 6,885,658 B1 | 4/2005 | Ress et al. | |
| 6,963,583 B1 | 11/2005 | Foti | |
| 6,981,022 B2 * | 12/2005 | Boundy | 709/204 |
| 7,346,076 B1 * | 3/2008 | Habiby et al. | 370/466 |
| 2001/0056466 A1 | 12/2001 | Thompson et al. | |
| 2002/0075849 A1 | 6/2002 | Tarle et al. | 370/352 |
| 2002/0080955 A1 | 6/2002 | Hou et al. | 379/395 |
| 2002/0114439 A1 | 8/2002 | Dunlap | 379/219 |
| 2002/0122547 A1 * | 9/2002 | Hinchey et al. | 379/221.01 |
| 2002/0124057 A1 | 9/2002 | Besprosvan | 709/219 |
| 2002/0176403 A1 | 11/2002 | Radian | 370/352 |
| 2002/0191590 A1 | 12/2002 | Niu et al. | 370/352 |
| 2003/0021264 A1 | 1/2003 | Zhakov et al. | 370/352 |
| 2003/0023730 A1 | 1/2003 | Wengrovitz et al. | 709/227 |
| 2003/0088619 A1 | 5/2003 | Boundy | |
| 2003/0227908 A1 * | 12/2003 | Scoggins et al. | 370/352 |
| 2004/0062230 A1 * | 4/2004 | Taylor et al. | 370/352 |
| 2004/0077351 A1 | 4/2004 | Inoue et al. | 455/444 |
| 2004/0172464 A1 | 9/2004 | Nag | 709/223 |
| 2008/0049783 A1 * | 2/2008 | Habiby et al. | 370/466 |

OTHER PUBLICATIONS

International Search Report for PCT/IB 03/06067, mailed May 19, 2004.

* cited by examiner

*Primary Examiner*—Thjuan K Addy
(74) *Attorney, Agent, or Firm*—Withrow & Terranova, P.L.L.C.

(57) ABSTRACT

The present invention provides a way to associate multimedia clients with telephony devices and create multimedia sessions related to a voice connection between the telephony devices.

34 Claims, 15 Drawing Sheets

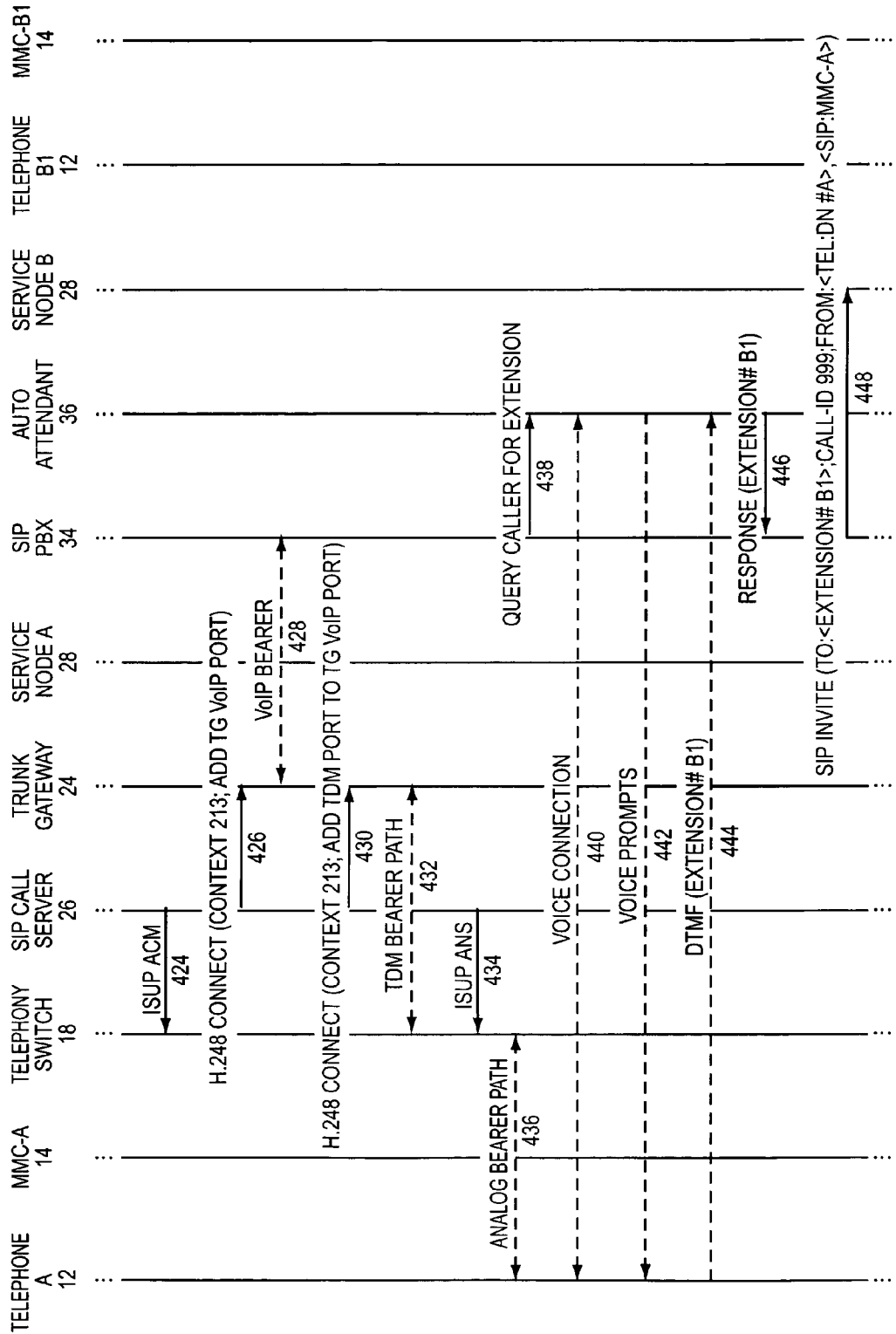

INTERWORKING OF MULTIMEDIA AND TELEPHONY EQUIPMENT

This application claims the benefit of U.S. provisional patent application Ser. No. 60/434,937, filed Dec. 20, 2002, the disclosure of which is hereby incorporated by reference in its entirety.

CROSS-REFERENCE TO RELATED APPLICATIONS

This application is related to U.S. patent application Ser. No. 10/325,143 filed Dec. 20, 2002 and entitled INTERWORKING OF MULTIMEDIA AND TELEPHONY EQUIPMENT, currently pending, the disclosure of which is incorporated herein by reference in its entirety.

FIELD OF THE INVENTION

The present invention relates to facilitating multimedia services, and in particular, associating multimedia services with traditional telephony services in an efficient manner.

BACKGROUND OF THE INVENTION

Traditional telephony services provided by digital switches, such as digital multiplexing switches, have reached their functional limits with existing user interfaces, which essentially are telephone sets having limited displays and simple keypads. Further, the telephone sets have limited bandwidth. Over newer packet networks, multimedia services are flourishing and are capable of exploiting the capabilities of advanced user terminals, desktop computers, and network appliances.

Currently, the vast majority of voice telephony is provided, at least in part, by traditional circuit-switched networks. Given the extensive infrastructure, reliability, and quality of service, these traditional telephony systems are likely to remain a significant part of voice communications for the foreseeable future. Unfortunately, there has been difficulty integrating voice sessions over the traditional telephony network with multimedia sessions over packet networks. In particular, there is a desire to associate multimedia devices with telephony devices, such as telephone terminals, and create multimedia sessions related to a voice connection. Users prefer the traditional telephony network for voice, yet the voice network is unacceptable for facilitating advanced multimedia services, such as screen sharing, video conferencing, and the like. Given the unique strengths of the respective communication systems, there is a need for an efficient and economical way to facilitate interworking between the networks. There is a further need to facilitate such interworking without requiring significant changes to the traditional telephony or packet-switched infrastructures and communication protocols.

Further, a large number of enterprises use public branch exchanges (PBXs) to provide most of the telephony services to the employees of that enterprise as opposed to relying on the public network telephony switch. In a typical situation, the PBX is involved in all calls within the enterprise while the public network telephony switch is used only for calls in and out of the enterprise. These enterprise users are also typically those most likely to want to combine traditional telephony services with multimedia services to improve employee productivity. Many functions or features provided by a traditional switch may be unavailable to enterprise users serviced by a PBX. Accordingly, those users most likely to need to combine multimedia and traditional telephony services are even further removed from such capability. Thus, there is also a need to facilitate interworking between public and enterprise systems.

SUMMARY OF THE INVENTION

The present invention provides a way to associate multimedia clients with telephony devices and create multimedia sessions related to a voice connection between the telephony devices. The telephony devices may be part of a public network or an enterprise network associated with a PBX. Further, calls can be routed in part over packet-switched and circuit-switched networks. Initially, a telephony switch will detect the telephone going off hook and sending digits to originate a call. The telephony switch will initially determine whether the caller has multimedia capabilities in addition to the ability to facilitate a voice call. The telephony switch will include or have access to a database, which will preferably include information sufficient to identify whether the telephone of the called party is associated with a multimedia client, and if so, provide addressing and port information for facilitating a media session with the multimedia client.

If the caller is not associated with a multimedia client having multimedia capabilities, the telephony switch will initiate normal call processing and routing of the voice call via the PSTN in traditional fashion. If the caller is associated with a multimedia client providing multimedia capabilities, the telephony switch will determine if the called party is not serviced by the associated service node and is thus outside of the service node's zone.

If the caller has multimedia capabilities and the called party is outside of the service node zone, the telephony switch will use a SIP call server for call processing to route the voice call via the packet network. If the called party is within the service node zone, the telephony switch will access another database, such as that provided by an LNP server, to determine if the called party is associated with multimedia capabilities. Preferably, the LNP server provides a database that has been modified to not only provide local number portability information but also to provide information bearing on the multimedia capabilities of the called party. Although other databases may be provided, the local number portability database is one that is in existence and readily modifiable to provide such functionality. In one embodiment, the LNP server is capable of identifying whether or not the called party is supported by SIP, which is highly indicative of multimedia capability. The LNP server may indicate that the called number has been ported to a SIP-capable device.

As such, the telephony switch can determine whether the called party has multimedia capabilities by seeing if the called party is supported by SIP. If the called party is supported by SIP, the telephony switch will initiate call processing via the SIP call server, which will facilitate routing of the call via the packet network and the trunk gateways. If the called party is not supported by SIP, the telephony switch will initiate call processing and routing via the PSTN in traditional fashion.

When call signaling is initiated via the SIP call server, the SIP call server supporting the caller will typically interact with one or more SIP call servers that are associated with the called party. In general, the SIP call server for the caller will route the voice call along with the multimedia client's address for the caller to the SIP call server associated with the called party. The called party's SIP call server will set up a voice call with the called party's telephone. Additionally, the called party's SIP call server will send the multimedia address and directory number associated with the caller and the directory number associated with the called party to the service node associated with the called party. The called party's service node will look up the address and port information for the called party's multimedia client and then send a message to the called party's multimedia client including the address and port information necessary to establish a media session with the caller's multimedia client.

Next, the called party's multimedia client will send a message to the caller's multimedia client including the address and port information for the called party's multimedia client via the service nodes. As noted, the service nodes will preferably act as SIP proxies for such communication sessions. If a multimedia session is desired by either the caller or called party, the multimedia clients associated therewith can simply initiate the communication session with the other multimedia client, because each multimedia client has the address and port information for the other. Preferably, the address and port information is also associated with identification indicia for the associated voice call.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 8:
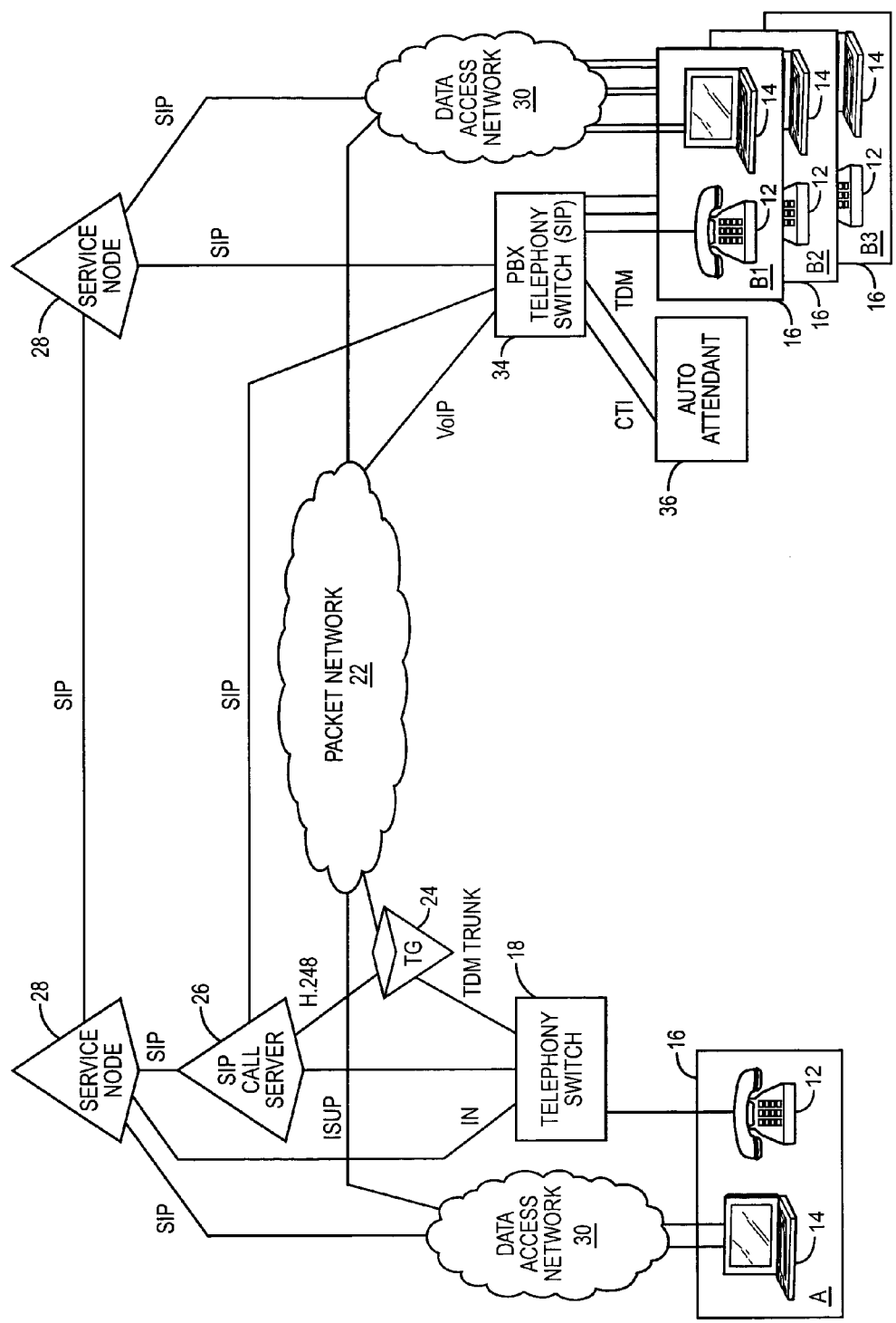

FIG. 8 a communication environment according to a fifth embodiment of the present invention.

Figure 9A:
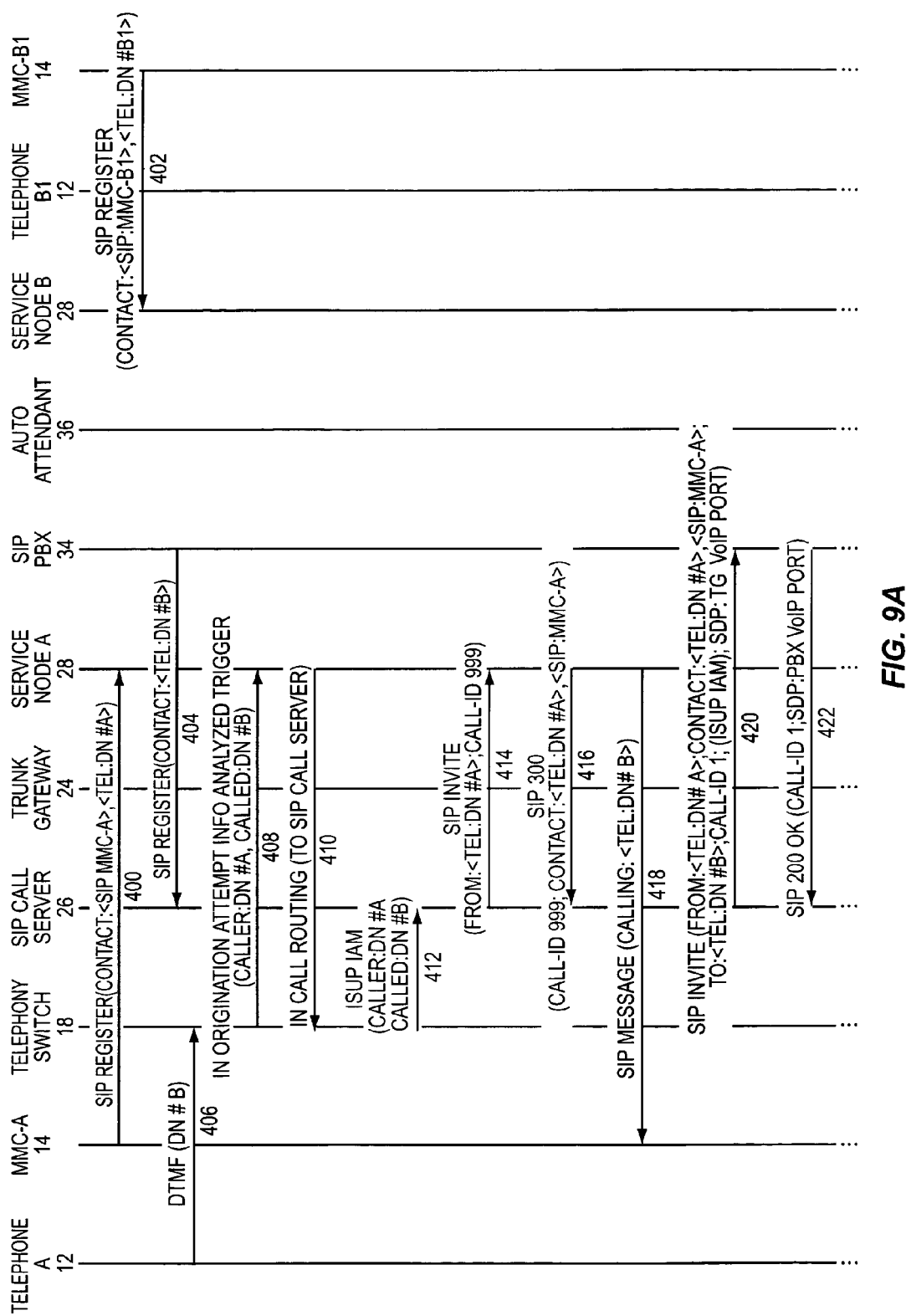
Figure 9C:
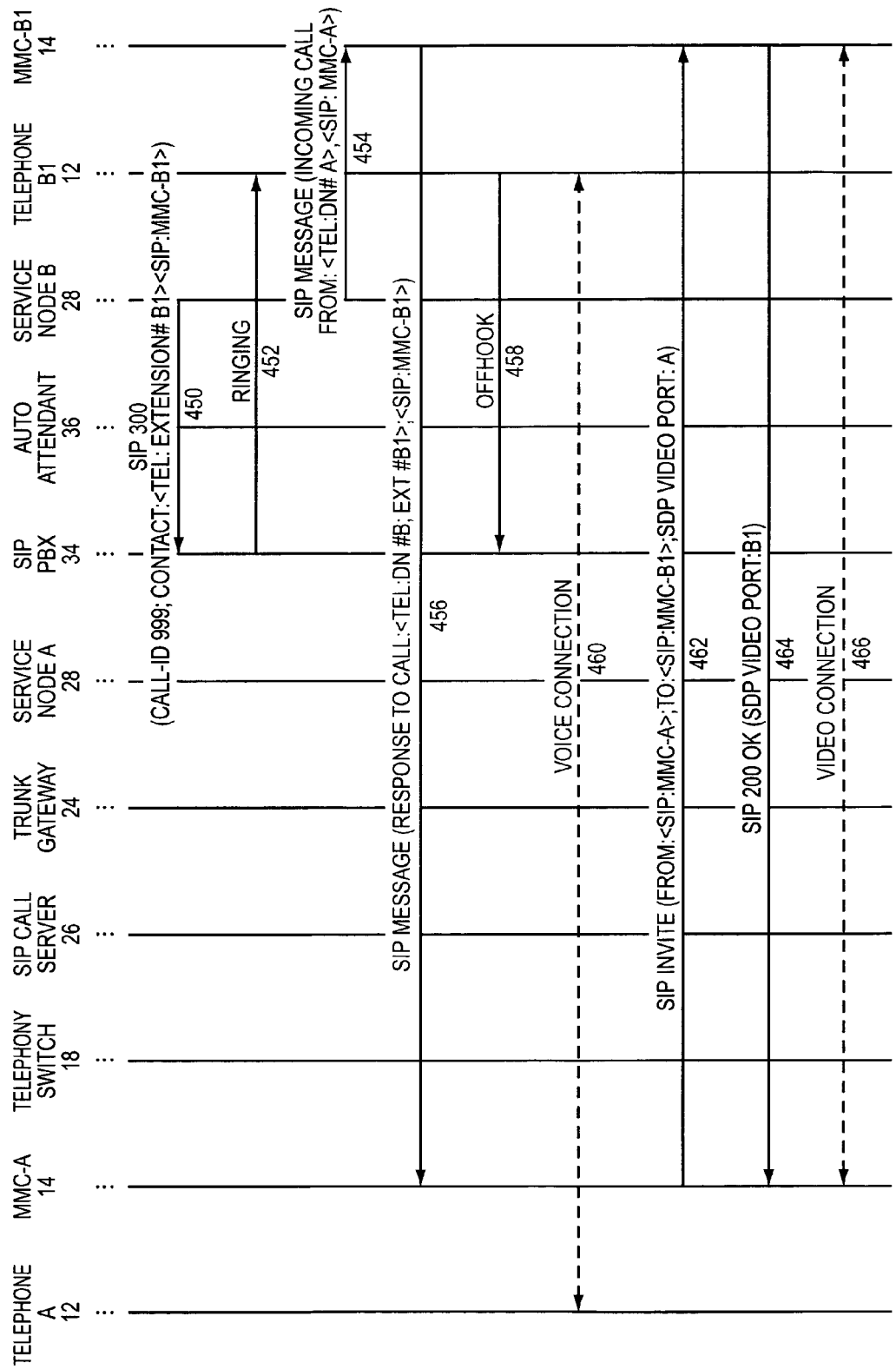

FIGS. 9A-9C are a call flow diagram according to a third embodiment of the present invention.

Figure 10:
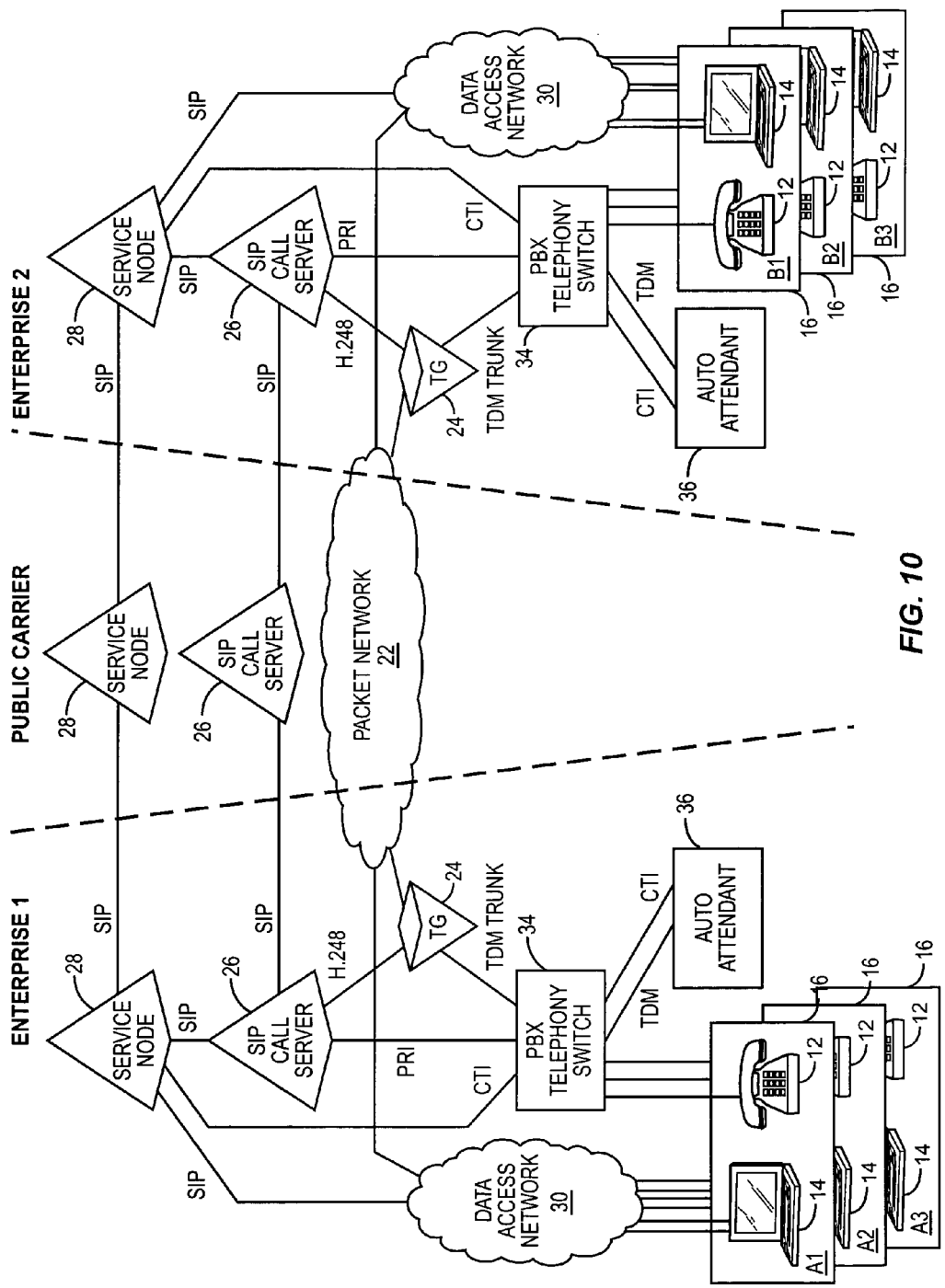

FIG. 10 is a communication environment according to a sixth embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
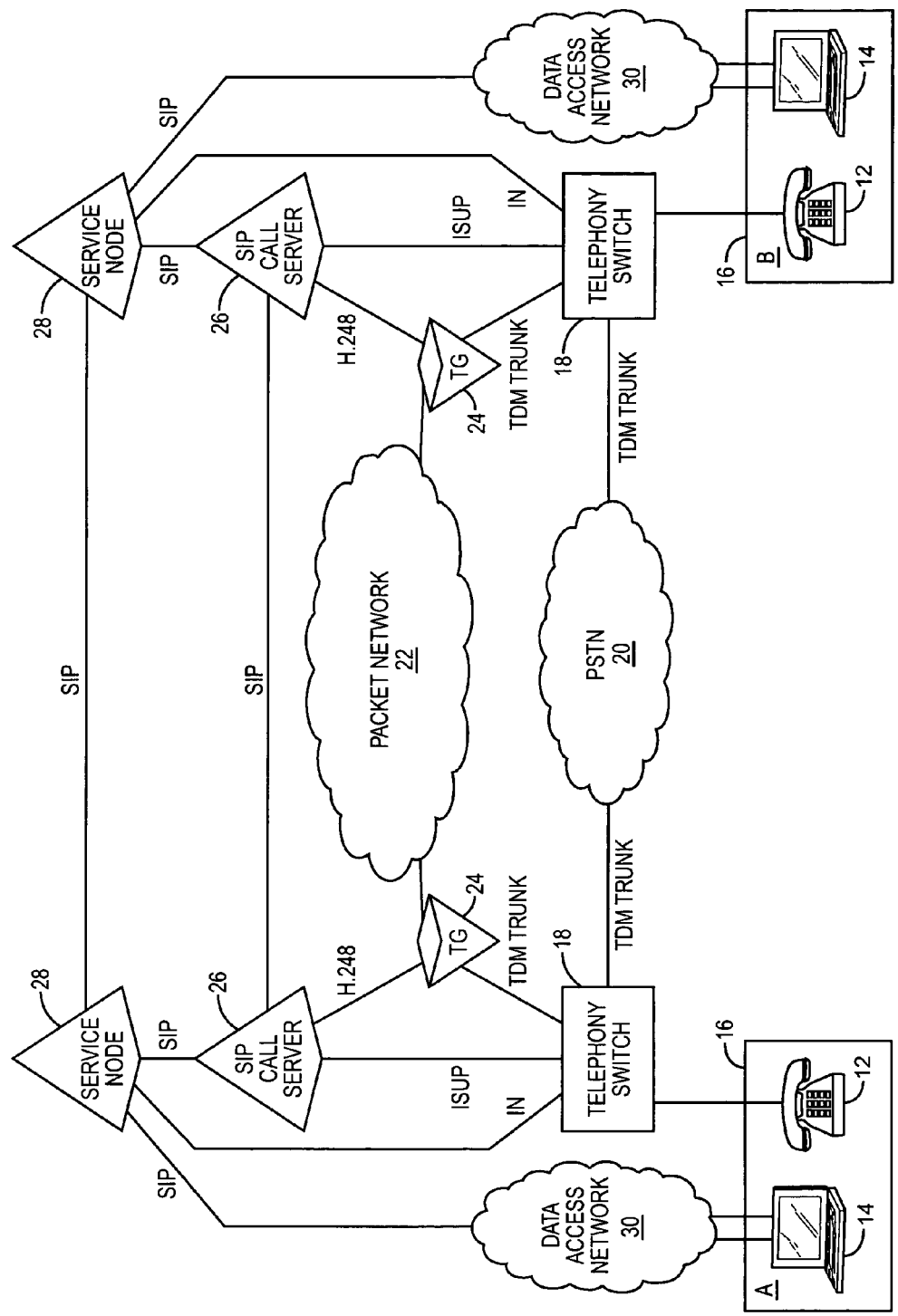
FIG. 1 illustrates a communication environment according to one embodiment of the present invention.

Turning now to FIG. 1, a communication environment 10 according to a first embodiment of the present invention is depicted, wherein a telephony device 12 capable of facilitating a voice-based telephone call is associated with a multimedia client (MMC) 14, which can be any type of device, such as a computer, capable of facilitating a multimedia session with one or more other devices. In general, the association of a telephony device 12 and a multimedia client 14 is referred to as a combined client 16. Accordingly, and as will be described below, a multimedia session with the multimedia client 14 can be associated with a voice call involving the telephony device 12. As those skilled in the art will recognize, the multimedia client 14 and the telephony device 12 may take many forms. For the purposes of description, the telephony device 12 will be referred to as a telephone 12. Further, communications for either of the telephone 12 or multimedia client 14 may be facilitated via packet, circuit-switched, or packet-switched means, as those skilled in the art will readily recognize.

In general, the telephones 12 will provide voice calls with other telephones 12 or other voice-capable devices via supporting telephony switches 18, preferably in one of two ways. The first way facilitates the voice call through the public switched telephone network (PSTN) 20, which facilitates call signaling via traditional intelligent networks, such as the Signaling System 7 (SS7) call signaling network, as well as providing bearer channels for the actual voice call in a traditional circuit-switched fashion. Thus, dedicated voice circuits are established between the telephones 12 through their respective telephony switches 18 and the PSTN 20.

Alternatively, the actual voice channel may be provided via the packet network 22 via trunk gateways (TGs) 24, which effectively interconnect the telephony switches 18 and the packet network 22 to provide the necessary conversion between circuit-switched voice and voice over packet (VoP) communications over the packet network 22. In this example, it is assumed that the telephony switch 18 is a circuit-switched telephony switch; however, the telephony switch 18 may be a wireless or packet-based switch without impacting the concepts of the present invention. When the voice call is supported by the packet network 22, the telephony switch 18 is provisioned to provide call signaling via a Session Initiation Protocol (SIP) (or other appropriate protocol) call server 26. The specification for SIP is provided in the Internet Engineering Task Force's Request for Comments (RFC) 3261: Session Initiation Protocol Internet Draft, which is hereby incorporated by reference in its entirety. The SIP call server 26 will receive call signaling messages from the telephony switch 18 and provide call signaling to the trunk gateway 24, as well as other SIP call servers 26 to facilitate VoP communications via the packet network 22.

When associating a media session with a voice call, the SIP call server 26 may also access a service node 28 to obtain an address for a multimedia client 14 associated with a telephony device 12, which are part of a combined client 16. Preferably, the service node 28 will act as a SIP proxy to facilitate media sessions between multimedia clients 14 directly or indirectly via other SIP proxies. Communications between the service node 28 and a multimedia client 14 are facilitated by a data access network 30, which may be a part of the packet network 22. Additionally, a local number portability (LNP) server 32 or other data-based server is preferably accessible by the telephony switch 18 to retrieve information indicative of whether a particular telephone 12 is part of a combined client 16, and thus, is associated with a multimedia client 14 wherein a media session may be associated with a voice call involving the telephone 12.

Although those skilled in the art will recognize other protocols and communication techniques, the exemplary embodiment provides for SIP communications between the SIP call server 26, service node 28, and multimedia client 14. The telephony switch 18 can interface the SIP call server 26 and service node 28 using existing signaling interfaces, such as the intelligent network (IN) and Integrated Services User Protocol (ISUP) protocols. The SIP call server 26 can interface with and control the trunk gateway 24 using the H.248 call control interface, wherein the trunk gateway 24 and the telephony switch 18 will interface using existing bearer telephony interfaces, such as those used for traditional time division multiplex (TDM) trunk control.

When associating a media session via a multimedia client 14 with a voice session facilitated by a telephone 12, several functions must be implemented. First, the telephony system must determine if the caller and called party are associated with multimedia clients 14. Next, the addresses of each of these multimedia clients 14 must be identified and provided to the respective multimedia clients 14, such that a media session can be established between the associated multimedia clients 14. The present invention provides an efficient and unique way to accomplish these steps, while minimizing the need for substantial reconfiguration or additions to the existing telephony infrastructure.

Figure 2:
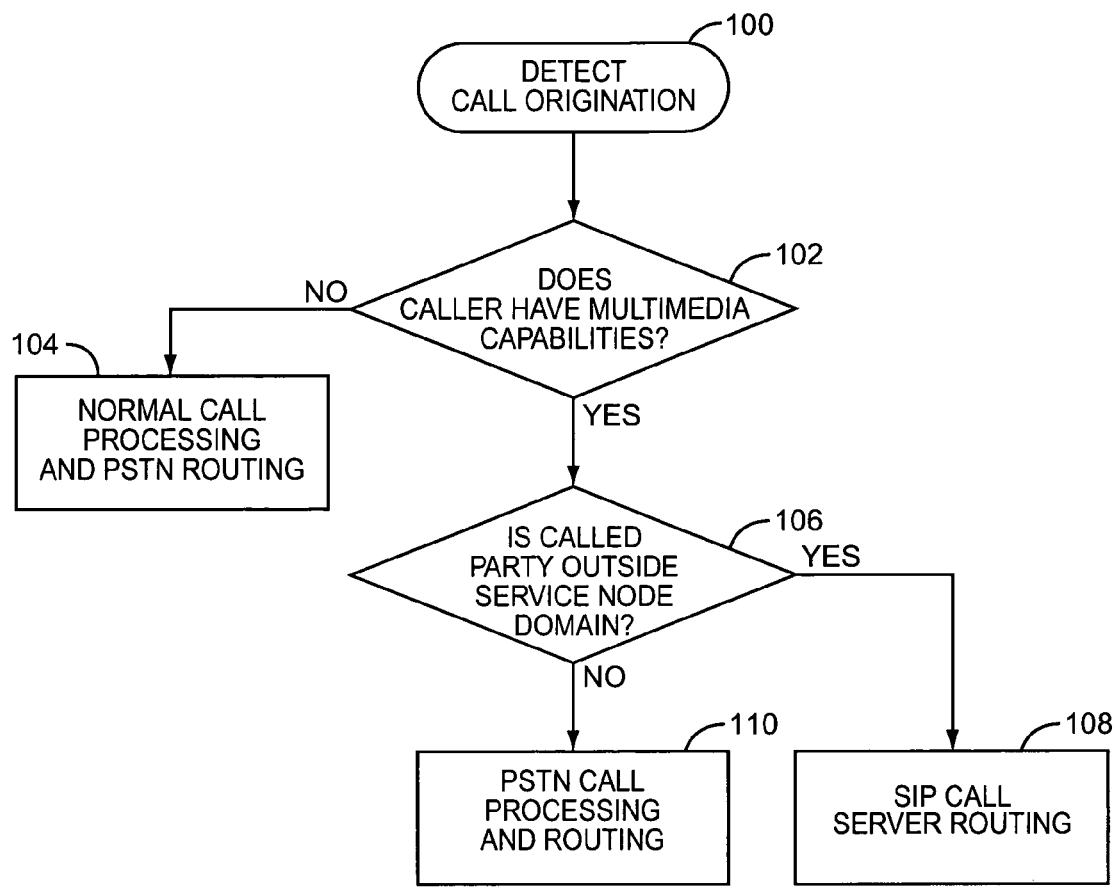
FIG. 2 is a flow diagram outlining the call routing decision process according to one embodiment of the present invention.

For the present invention, the local telephony switch 18 associated with a telephone 12 initiating a voice call plays a significant role in determining whether the calling and called parties have multimedia capability and deciding how to facilitate call signaling and routing of the voice call. A basic flow diagram outlining how the telephony switch 18 determines how to route a call is provided in FIG. 2. Notably, the telephony switch 18 making the call routing decisions is preferably the one originating the call, and is thus associated with the caller's telephone 12.

Initially, the telephony switch 18 will detect the telephone 12 going off hook and sending digits to originate a call (step 100). The telephony switch 18 will initially determine whether the caller has multimedia capabilities in addition to the ability to facilitate a voice call (step 102). The telephony switch 18 will include or have access to a database, which will preferably include information sufficient to identify whether the telephone 12 of the called party is associated with a multimedia client 14, and if so, provide addressing and port information for facilitating a media session with the multimedia client 14.

If the caller is not associated with a multimedia client 14 having multimedia capabilities (step 102), the telephony switch 18 will initiate normal call processing and routing of the voice call via the PSTN 20 in traditional fashion (step 104). If the caller is associated with a multimedia client 14 providing multimedia capabilities (step 102), the telephony switch 18 will determine if the called party is not serviced by the associated service node 28 and is thus outside of the service node's zone.

If the caller has multimedia capabilities and the called party is outside of the service node zone (step 106), the telephony switch 18 will use the SIP call server 26 for call processing to route the voice call via the packet network 22 (step 108). If the called party is within the service node zone (step 106), the telephony switch 18 will access another database, such as that provided by the LNP server 32, to determine if the called party is associated with multimedia capabilities (step 110). Preferably, the LNP server 32 provides a database that has been modified to not only provide local number portability information but also to provide information bearing on the multimedia capabilities of the called party. Although other databases may be provided, the local number portability database is one that is in existence and readily modifiable to provide such functionality. In one embodiment, the LNP server 32 is capable of identifying whether or not the called party is supported by SIP, which is highly indicative of multimedia capability. The LNP server 32 may indicate that the called number has been ported to a SIP-capable device.

As such, the telephony switch 18 can determine whether the called party has multimedia capabilities by seeing if the called party is supported by SIP (step 112). If the called party is supported by SIP, the telephony switch 18 will initiate call processing via the SIP call server 26, which will facilitate routing of the call via the packet network 22 and the trunk gateways 24 (step 108). If the called party is not supported by SIP (step 112), the telephony switch 18 will initiate call processing and routing via the PSTN in traditional fashion (step 114).

When call signaling is initiated via the SIP call server 26, the SIP call server 26 supporting the caller will typically interact with one or more SIP call servers 26 that are associated with the called party. In general, the SIP call server 26 for the caller will route the voice call along with the multimedia client's address for the caller to the SIP call server 26 associated with the called party. The called party's SIP call server 26 will set up a voice call with the called party's telephone 12. Additionally, the called party's SIP call server 26 will send the multimedia address and directory number associated with the caller and the directory number associated with the called party to the service node 28 associated with the called party. The called party's service node 28 will look up the address and port information for the called party's multimedia client 14 and then send a message to the called party's multimedia client 14 including the address and port information necessary to establish a media session with the caller's multimedia client 14.

Next, the called party's multimedia client 14 will send a message to the caller's multimedia client 14 including the address and port information for the called party's multimedia client 14 via the service nodes 28. As noted, the service nodes 28 will preferably act as SIP proxies for such communication sessions. If a multimedia session is desired by either the caller or called party, the multimedia clients 14 associated therewith can simply initiate the communication session with the other multimedia client 14, because each multimedia client 14 has the address and port information for the other. Preferably, the address and port information is also associated with identification indicia for the associated voice call. Further details are provided in the following examples.

Figure 3A:
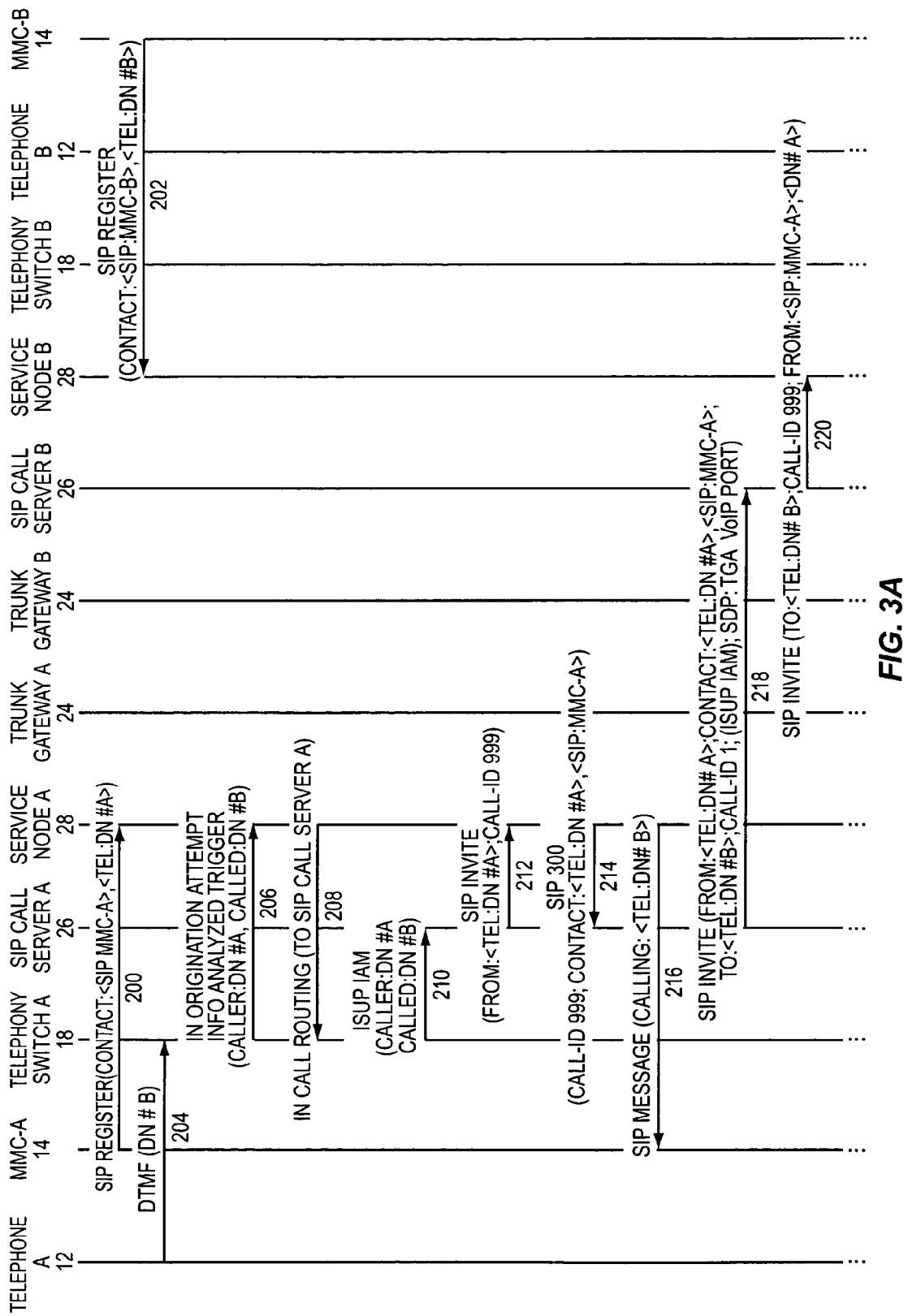
FIGS. 3A-3C are a call flow diagram according to one embodiment of the present invention.
Figure 3B:
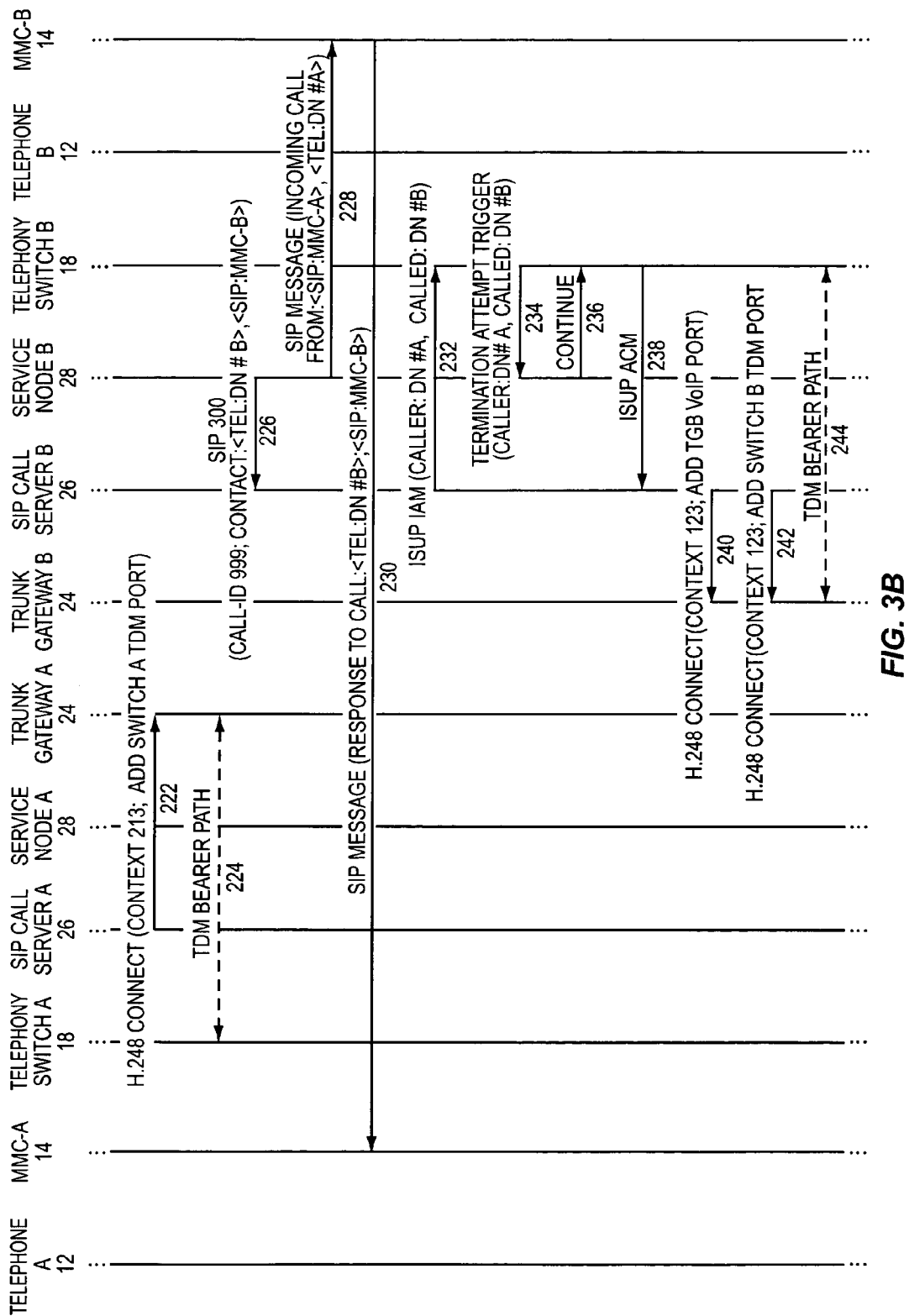
Figure 3C:
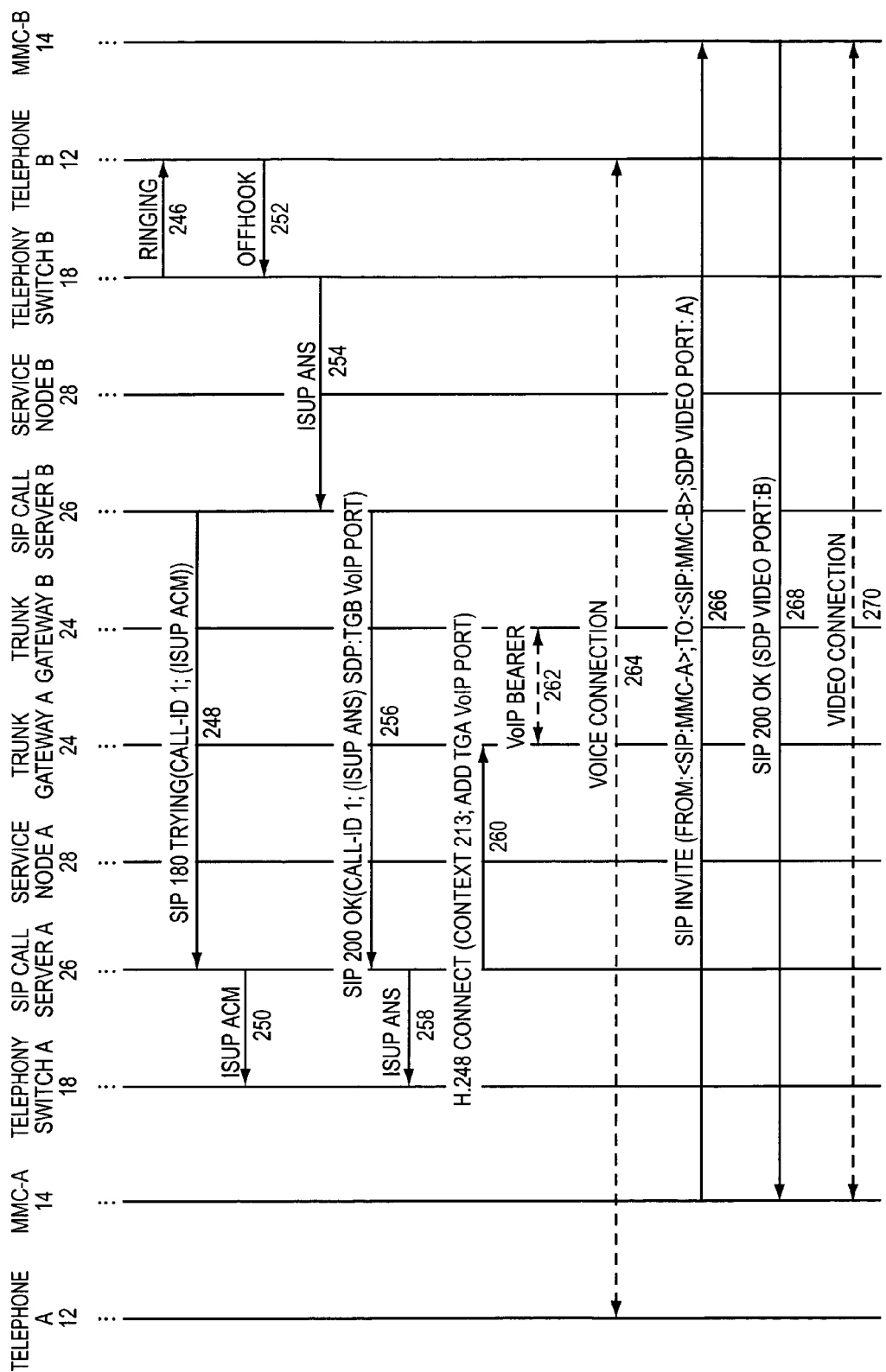

For the sake of clarity and conciseness, the following examples relate to initiating a call from a telephone 12 within a combined client 16, which is referenced as A. The call is intended for a telephone 12 in another combined client 16, which is referenced as B. All of the devices supporting and associated with the caller, including the telephone 12 and multimedia client 14, will be designated with an A, and those supporting and associated with the called party will be designated with a B. Turning now to FIGS. 3A-3C, a call flow diagram is provided for initiating a telephone call from caller A to called party B, establishing a voice session, and then establishing an associated video session.

Initially, the multimedia clients, MMC-A and MMC-B (14), will register with service nodes A and B (28), respectively, to provide their multimedia addresses and the directory numbers for the associated telephones A and B (12) (steps 200 and 202). When a voice call is initiated at telephone A (12) and directed to telephone B (12), dual tone multi-frequency (DTMF) digits for the telephone number of telephone B (12)

are sent to telephony switch A (18) (step 204). After telephony switch A (18) receives the dialed directory number for telephone B (12), telephony switch A (18) will determine whether the caller has multimedia capabilities (step 206). In one embodiment, telephony switch A (18) is provisioned such that the multimedia capability of telephone A (12) is known by how the line was provisioned. Thus, an incoming call for the particular line will initiate the trigger indicating the telephone A (12) has an associated multimedia client A (14) providing additional multimedia capabilities. Next, telephony switch A (18) will attempt to determine whether the called party has multimedia capability (step 208).

Since in this example the called party is supported by a different service node B (26), telephony switch B (18), SIP call server B (26), and LNP server B (32), telephony switch A (18) will recognize from the directory number of telephone B (12) that it cannot determine the multimedia capabilities associated with telephone B (12) and will initiate routing via SIP call server A (26). Telephony switch A (18) will then send an ISUP initiate answer message (IAM) identifying the directory numbers for caller A and called party B to SIP call server A (26) (step 210), which will initiate a SIP INVITE message to service node A (28), including the directory number for telephone A (12) and an identifier for the call (step 212). Service node A (28) will use the provider information to look up the address for multimedia client A (14) and send the address for multimedia client A (14) back to SIP call server A (26), preferably along with the directory number for telephone A (12) and the call identifier in a SIP 300 message (step 214). Preferably, service node A (28) is also configured to send a SIP MESSAGE message to multimedia client A (14) indicating that a call is in progress to telephone B (12) (step 216).

SIP call server A (26) will then send a SIP INVITE message to SIP call server B (26) to initiate a voice call via the packet network 22 between telephones A and B (12) (step 218). The SIP INVITE message will include the directory numbers of telephones A and B (12), the address for multimedia client A (14), and the call identifier, along with the port on trunk gateway A (24) to use for the voice session. SIP call server B (26) will send a SIP INVITE message including the directory number for telephone B (12) and the call identifier to obtain the address for multimedia client B (14) (step 220).

SIP call server A (26) will send an H.248 CONNECT message to trunk gateway A (24) to reserve a VoIP port in association with a particular context corresponding to the call (step 222). SIP call server A (26) will also send an H.248 CONNECT message to trunk gateway A (24) to reserve a TDM port associated with the context corresponding to the call (step 224). At this point, a TDM bearer path is available for the call between telephony switch A (18) and trunk gateway A (24) (step 226).

In the meantime, service node B (28) is responding to the SIP INVITE received from SIP call server B (26) to retrieve the address for multimedia client B (14). Service node B (28) will respond to the INVITE by sending a SIP 300 message back to SIP call server B (26), wherein the SIP 300 message includes the call identification, directory number for B, and the address for multimedia client B (14) (step 228). Service node B (28) will also send a SIP MESSAGE message to send the address for multimedia client A (14) and the directory number for telephone A (12) to multimedia client B (14) (step 230). Thus, multimedia client B (14) has the addressing for multimedia client A (14), and recognizes that a call is being initiated from telephone A (12) to telephone B (12). In response, multimedia client B (14) will send a SIP MESSAGE message including the directory number for telephone B (12) and the address for multimedia client B (14) to multimedia client A (14), preferably through the service nodes A and B (28), which act as SIP proxies for the respective multimedia clients A and B (14) (step 232).

In response to the previous SIP 300 message, SIP call server B (26) will begin the steps of establishing a TDM bearer path with telephone B (12). Thus, an ISUP IAM message including the directory number for telephone A (12) and the directory number for telephone B (12) to telephony switch B (18) (step 234). In response, telephony switch B (18) will generate an intelligent network termination attempt trigger, which is sent directly to service node B (26), and includes the directory numbers for telephone A (12) and telephone B (12) (step 236). Service node B (28) will respond with a CONTINUE message (step 238), which will direct telephony switch B (18) to establish a voice connection with telephone B (12). As such, telephony switch B (18) will send an answer call message (ACM) to SIP call server B (26) (step 240), which will send an H.248 CONNECT message to trunk gateway B (24) to reserve a VoIP port in association with a particular context (step 242). At this point, a VoIP bearer channel is established between trunk gateways A and B (24) (step 244). SIP call server B (26) will also send an H.248 CONNECT message to trunk gateway B (24) to reserve a TDM port for the particular context associated with the call (step 246). Once the TDM port is reserved for the call on trunk gateway B (24), a TDM bearer path is established between trunk gateway B (24) and telephony switch B (18) (step 248). In further response to the CONTINUE message, telephony switch B (18) will send a RINGING message to telephone B (12) (step 250), which will trigger telephone B (12) to begin ringing. In the meantime, SIP call server B (26) will send a SIP 180 TRYING message identifying the call and forwarding the ISUP ACM message to SIP call server A (26) (step 252), which will send an ISUP ACM message to telephony switch A (18) (step 254).

Once telephone B (12) is answered, an OFFHOOK message is sent from telephone B (12) to telephony switch B (18) (step 256), which will forward an ISUP ANS message to SIP call server B (26) (step 258). SIP call server B (26) will send a 200 OK message to SIP call server A (26) identifying the call, providing the ISUP ANSWER message, and identifying the VoIP port on trunk gateway B (24) using the session data protocol (step 260). SIP call server A (26) will respond by forwarding the ISUP ANS message to telephony switch A (18) indicating that telephone B (12) has gone off hook (step 262). In response, telephony switch A (18) will facilitate a connection between telephone A (12) and the other caller paths to effect a voice connection from telephone A (12) to telephone B (12) (step 264).

If a media session, and in this particular example a video connection, is desired between multimedia client A (14) and multimedia client B (14), either of the multimedia clients 14 may initiate the session. As illustrated, multimedia client A (14) initiates the video session by sending a SIP INVITE message to multimedia client B (14) using the previously received address for multimedia client B (14). The SIP INVITE message will include the address for multimedia client A (14), as well as the (video) port to which multimedia client B (14) should stream video using the session data protocol (step 266). In response, multimedia client B (14) will send a SIP 200 OK message including the video port for multimedia client B (14) to which multimedia client A (14) should send streaming video (step 268). At this point, multimedia client A (14) and multimedia client B (14) can each send streaming video to effectively provide a video connection therebetween in association with the voice call (step 270).

Figure 4:
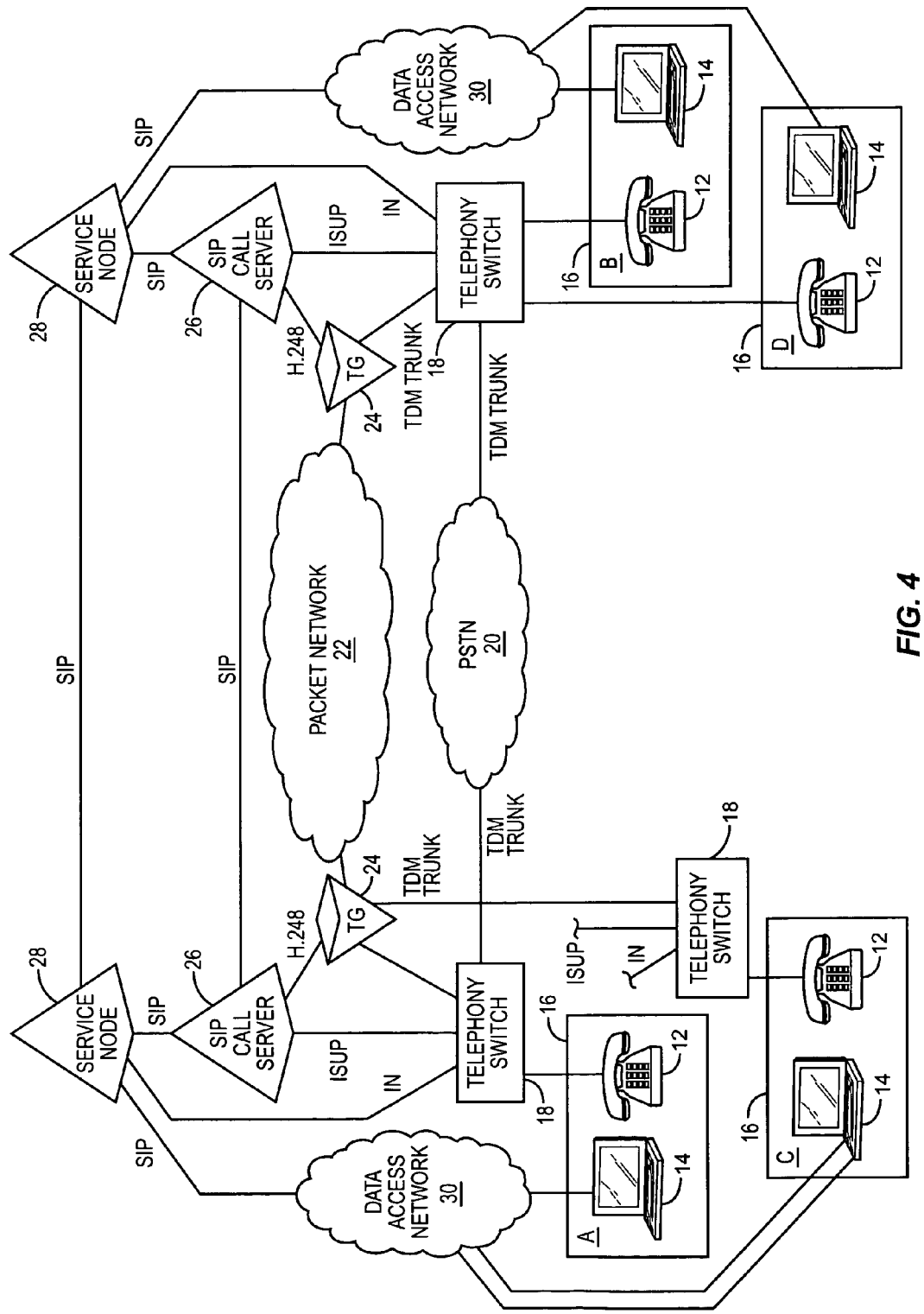
FIG. 4 is a communication environment according to a second embodiment of the present invention.

With reference to FIG. 4, it is illustrated that the concepts of the present invention are applicable to systems wherein multiple telephony switches 18 are supported by a single service node 28, SIP call server 26, trunk gateway 24, or a combination thereof. Also illustrated is the concept of multiple telephony switches 18 accessing a common LNP server 32.

Figure 5:
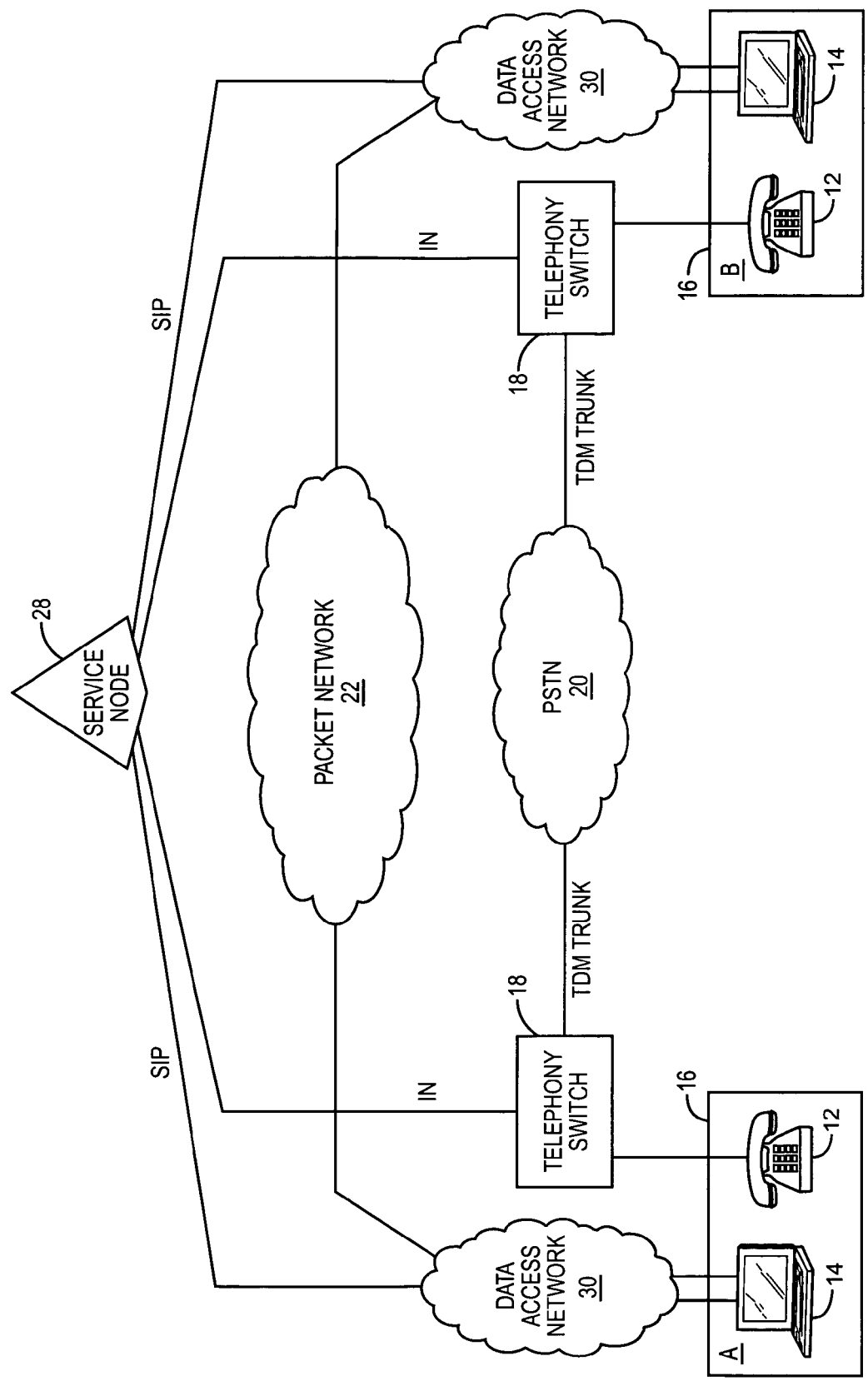
FIG. 5 is a communication environment according to a third embodiment of the present invention.
Figure 6A:
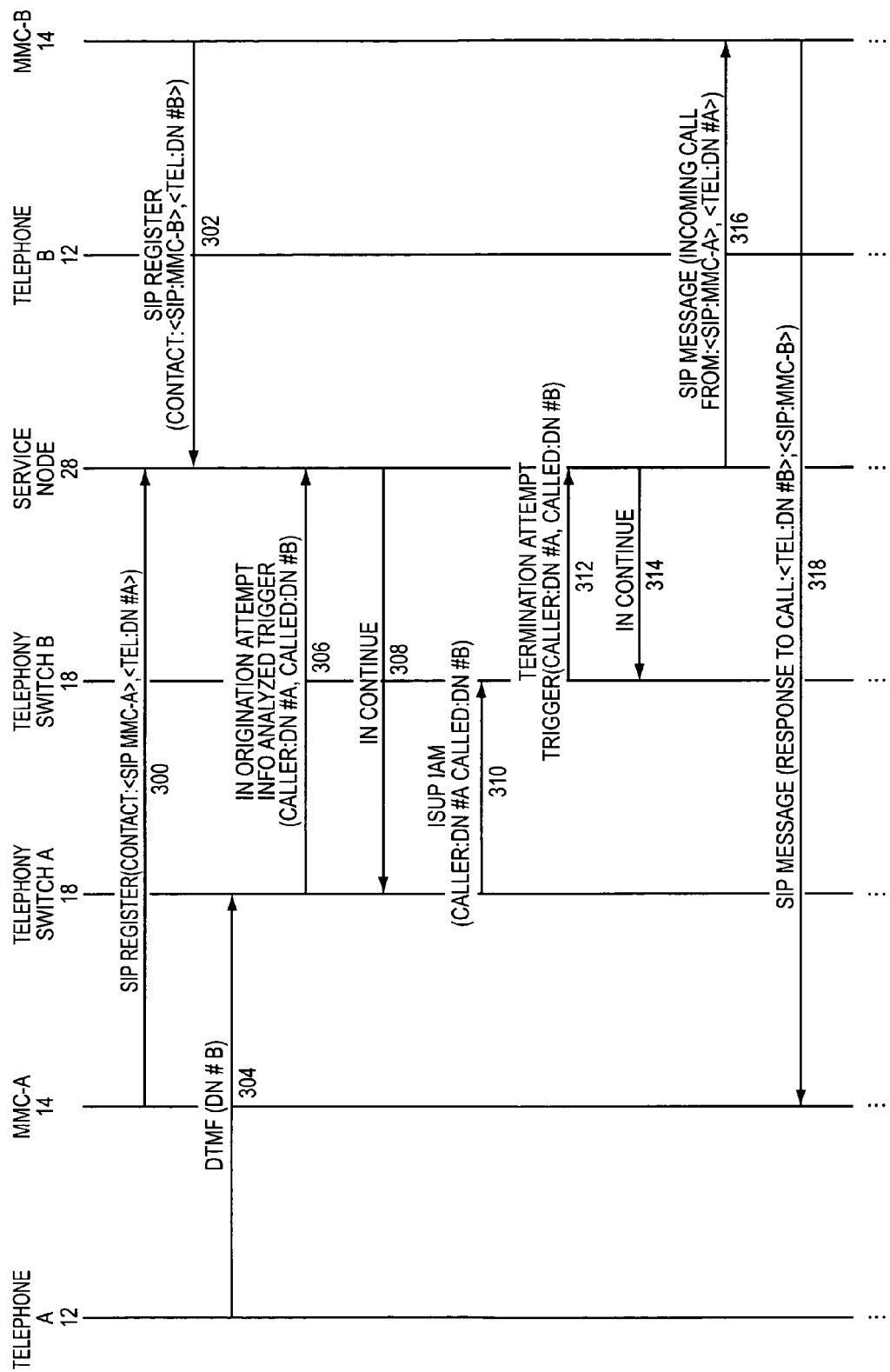
FIGS. 6A and 6B are a call flow diagram according to a second embodiment of the present invention.
Figure 6B:
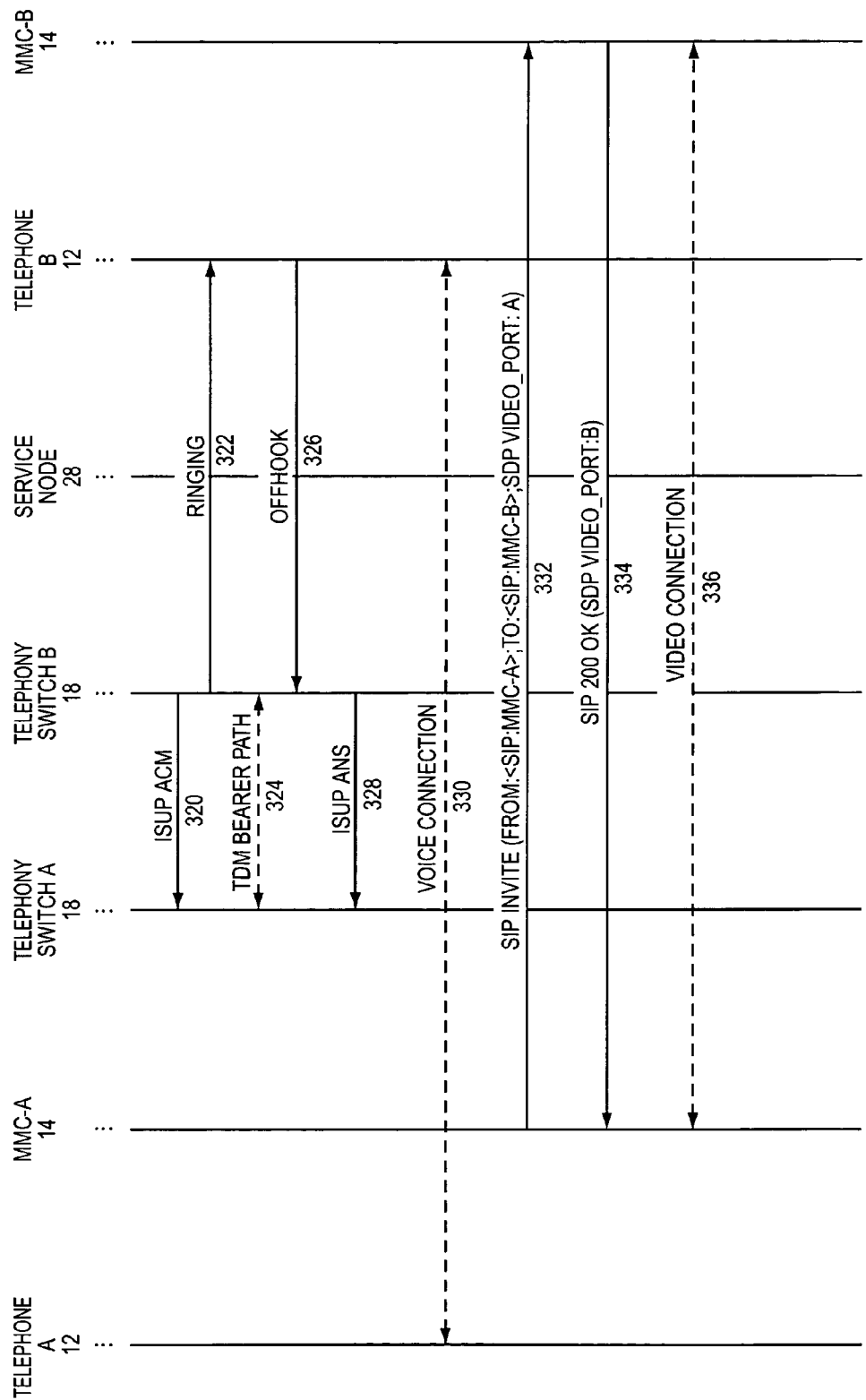

With reference to FIG. 5, an alternative embodiment is shown wherein a single service node 28 supports multimedia clients A and B (14) and essentially provides an association between the directory numbers and multimedia addresses for combined clients A and B (16). Further, the telephony switches 18 can both access a common LNP server 32. A call flow for establishing a voice and associated video session within the environment depicted in FIG. 5 is provided in FIGS. 6A and 6B. Again, assume that a call directed to telephone B (12) is initiated from telephone A (12).

Initially, multimedia client A (14) and multimedia client B (14) will register with the service node 28 to provide multimedia addresses associated with a corresponding directory number (steps 300 and 302). When the telephone call is originated, telephone A (12) will send the DTMF digits for telephone B (12) to telephony switch A (18) (step 304), which will access the LNP server 32 to determine whether telephone B (12) has multimedia capabilities (step 306). The LNP server 32 will respond with an appropriate indication to telephony switch A (18) that the directory number for telephone B (12) is not ported (step 308). When the telephone number for telephone B (12) is not ported, telephony switch A (18) will recognize that telephone B (12) is not supported by a SIP call server 26, and will initiate routing via the PSTN 20 by sending an ISUP IAM message directly to telephony switch B (18) instead of initiating signaling to associated SIP call server 26 (not present in the embodiment of FIG. 5).

Telephony switch A (18) will proceed with establishing a voice call by sending an ISUP IAM message, including the directory numbers for telephone A (12) and telephone B (12), to telephony switch B (18) (step 310), which will send a termination attempt trigger including the directory numbers for telephones A and B (12) to the service node 28 (step 312). The service node 28 will respond by sending a CONTINUE message to telephony switch B (18) (step 314), as well as sending a SIP MESSAGE message, including the address for multimedia client A (14) and the directory number for telephone A (12) to multimedia client B (14) (step 316). Multimedia client B (14) will send a SIP MESSAGE message, including the address for multimedia client B (14) and the directory number for telephone B (12) to multimedia client A (14) (step 318), preferably via the service node 28 acting as a SIP proxy for both multimedia clients A and B (14). At this point, multimedia client A (14) has the address for multimedia client B (14), and multimedia client B (14) has the address for multimedia client A (14). As such, each of the multimedia clients A and B (14) can initiate media sessions therebetween.

In the meantime, telephony switch B (18) will send an ISUP ACM message to telephony switch A (step 320), as well as send a RINGING message to telephone B (12) (step 322), which will begin ringing. A TDM bearer path is established between telephony switches A and B (18) (step 324), while telephone B (12) awaits an answer. When answered, telephone B (12) will send an OFFHOOK message to telephony switch B (18) (step 326), which will send an ISUP ANS message to telephony switch A (18) (step 328) to complete the voice connection between telephones A and B (12) (step 330).

Assuming that user A wishes to initiate a video session with user B, sufficient action is taken to trigger multimedia client A (14) to send a SIP INVITE message to multimedia client B (14) (step 332), wherein the INVITE message includes the video port to which multimedia client B (14) should stream video. In response, multimedia client B (14) will send a SIP 200 OK message (step 334), which provides the video port to which multimedia client A (14) should stream video to multimedia client B (14). At this point, a video connection is established between multimedia clients A and B (14) (step 336).

Figure 7:
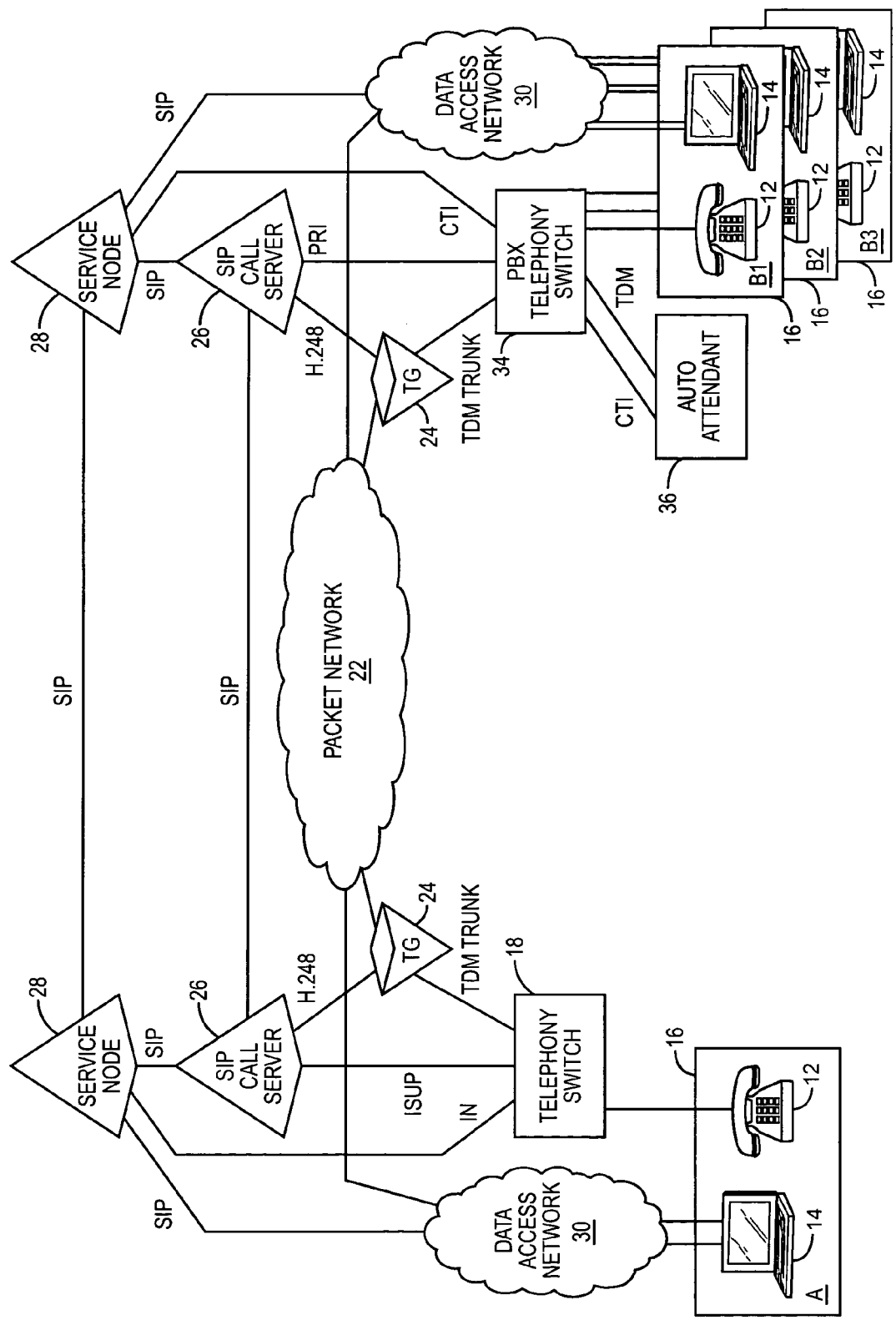
FIG. 7 is a communication environment according to a fourth embodiment of the present invention.

Another embodiment is illustrated in FIG. 7, wherein the applicability of the present invention is applied to a public branch exchange (PBX). In a PBX system, a PBX telephony switch 34 generally provides one or more common directory numbers and supports numerous telephone extensions corresponding to numerous telephones, such as telephones B1 through B3. Generally, an incoming call comes in to one of the main numbers provided by the PBX telephony switch 34, and a human or automated attendant 36 answers the call and interacts with the caller to determine an appropriate extension. Once the extension is determined, the call is directed to the proper telephone B1-B3. Thus, only one or a few telephone numbers are associated with a much larger number of telephones, and thus, the service node 28 cannot simply associate a single directory number with an address for a multimedia client 14, which is associated with a given telephone B1-B3. The present invention uses a service node 28 to associate the extension number for telephones 12 supported by the PBX telephony switch 34 with a corresponding multimedia client 14. The extension number is obtained during the automated attendant session for the incoming call and provided to the service node 28, which will forward the address of the multimedia client 14 associated with the telephone 12 originating the call to the multimedia client 14 associated with the extension terminating the call. Notably, the functionality of the SIP call server 26 supporting the PBX telephony switch 34 may be incorporated within the PBX telephony switch 34, as illustrated in FIG. 8. Thus, call signaling associated with a voice session can be associated with a multimedia session and be handled within the PBX telephony switch 34. Further, the trunk gateway functionality is also shown as being implemented within the PBX telephony switch 34, wherein bearer traffic is sent in packet form directly to the packet network 22. Those skilled in the art will recognize various configurations for both telephony switches 18 and PBX telephony switches 34.

An exemplary call flow diagram for originating a call directed to telephone B1 (12) from telephone A (12) and subsequently establishing a video session between multimedia client A (14) and multimedia client B1 (14) is shown in FIGS. 9A-9C. Initially, multimedia client A (14) will register with service node A (26) by sending a SIP REGISTER message identifying the directory number for telephone A (12) and the address for the associated multimedia client A (14) (step 400). Similarly, multimedia client B1 (14) will send a SIP REGISTER message providing its address in association with a directory number for telephone B1 (12) to service node B (28). The PBX telephony switch 34, simply referred to as a SIP PBX 34 hereafter, will register with service node B (28) by providing the main directory number or numbers (B) that service each of the telephones B1-B3 (12) (step 404).

User A will initiate a telephone call to telephone B1 (12) by dialing the main directory number (B), which is sent in a DTMF format to telephony switch 18 (step 406). Telephony switch 18 will query the LNP server 32 to see if the extensions associated with directory number B provide multimedia capabilities (step 408). Notably, it is assumed that all extensions either are or are not associated with multimedia clients 14. The LNP server 32 will respond to the telephony switch 18 by sending routing information indicating the directory number was ported to a SIP device for call signaling messages. The routing information will tell telephony switch 18 to send the call signaling information to SIP call server 26 (step 410). Telephony switch 18 will continue with the call by sending an ISUP IAM message including the directory number for telephone A (12) and the main directory number (B) for the PBX 34 to the call server 26 (step 412), which will send a SIP INVITE message to service node A (28) with the directory number for telephone A (12) and a call identifier to obtain the address for multimedia client A (14) (step 414). Service node A (28) will send a SIP 300 message with the call identifier and the directory number for telephone A (12) as well as the address for multimedia client A (14) (step 416). Service node A (28) will also send a SIP MESSAGE message to multimedia client A (14) indicating that a call is in progress to directory number B (step 418).

Meanwhile, the SIP call server 26 will send a SIP INVITE message to the SIP PBX 34 (step 420). The INVITE message will include the directory number for telephone A (12), the address for multimedia client A (14), the call identification, and a VoIP port for trunk gateway 24. The SIP PBX 34 will respond with a SIP 200 OK message, which includes the call identifier along with the VoIP port of the SIP PBX 34 (step 422). The SIP call server 26 will send an ISUP ACM message to telephony switch 18 (step 424), as well as send an H.248 CONNECT message to the trunk gateway 24 with a particular context and instructions to reserve the identified VoIP port (step 426). At this point, a VoIP bearer path is established between the trunk gateway 24 and SIP PBX 34 (step 428). The SIP call server 26 will also send an H.248 CONNECT message to the trunk gateway 24 with the particular context to reserve a TDM port and associate it with the identified trunk gateway VoIP port (step 430) to establish a TDM bearer path between trunk gateway 24 and telephony switch 18 (step 432). SIP call server 26 will also send an ISUP ANS message to telephony switch 18 (step 434), which will establish the analog bearer path between telephone A (12) and telephony switch 18 (step 436).

At this point, there is a voice connection between telephone A (12) and SIP PBX 34, which will instruct the automated attendant 36 to query the caller for the desired extension (step 438) and connect the voice connection to the automated attendant 36 (step 440). The automated attendant 36 will send voice prompts to query the caller for the desired extension (step 442). The caller will either speak or dial in using the keypad the extension number for telephone B1 (12) (step 444). The automated attendant 36 will send the extension number for telephone B1 (12) to the SIP PBX 34 (step 446), which will initiate a SIP INVITE to service node B (28) (step 448). The SIP INVITE will include call identification, as well as the extension number for telephone B1 (12). Service node B (28) will use the extension number for telephone B1 (12) to provide the address for the corresponding multimedia client B1 (14) back to the PBX 34 in a SIP 300 message (step 450). The SIP 300 message will also include the call identification and the extension number for telephone B1 (12).

The SIP PBX 34 will send a RINGING message to telephone B1 (12) (step 452) to cause telephone B1 (12) to ring. In the meantime, service node B (28) will send a SIP MESSAGE message to multimedia client B1 (14) (step 454) indicating that there is a call coming in from telephone A (12) and providing an address for multimedia client A (14). Multimedia client B1 (14) will send a SIP MESSAGE message to multimedia client A (14) including the address for multimedia client B1 (14), the main directory number B, and the extension number for telephone B1 (14) (step 456). When telephone B1 (12) is answered, an OFFHOOK message is sent to the SIP PBX 34 (step 458), which will establish an analog bearer path between telephone B1 (12) and the SIP PBX 34 (step 460). At this point, a voice connection is available between telephone A (12) and telephone B1 (12) (step 462).

Assuming the caller wishes to initiate a video connection or other media session in association with the voice connection, a SIP INVITE message is initiated from multimedia client A (14) to multimedia client B1 (14), wherein the message includes the addresses for multimedia clients A and B1 (14) as well as the port to which multimedia client B1 (14) should send streaming video to multimedia client A (14) (step 464). In response, multimedia client B1 (14) will send a SIP 200 OK message including the port to which multimedia client A (14) should send streaming video to multimedia client B1 (14) (step 466). At this point, multimedia clients A and B1 (14) have effectively established a bi-directional video connection and can send streaming video to each other (step 468).

With reference to FIG. 10, the present invention is also applicable to scenarios wherein multimedia capability is provided between telephones 12 supported by different PBX telephony switches 34. In these cases, LNP servers 32 of a public carrier are accessed to determine if the far end telephones 12 are associated with multimedia clients 14, and service nodes 28 and SIP call servers 26 within the public carrier cooperate with those in the different enterprise networks (1 and 2) to facilitate the association of voice and media sessions. As depicted, the preferable interface between the PBX telephony switch 34 and the service node 28 is a computer telephony interface (CTI), wherein the preferable interface between the SIP call server 26 and the PBX telephony switch 34 is a primary rate interface (PRI).

From the above, the present invention provides an improved way to associate multimedia clients 14 to telephony terminals 12 and create multimedia sessions related to the voice connection in both public and enterprise systems, as well as between public and enterprise systems. Those skilled in the art will recognize improvements and modifications to the preferred embodiments of the present invention. All such improvements and modifications are considered within the scope of the concepts disclosed herein and the claims that follow.

What is claimed is:

1. A method for associating multimedia clients with telephony devices comprising:
   a) receiving from a first telephony device having a first telephone number a second telephone number associated with a second telephony device to initiate a voice call from the first telephony device to the second telephony device;
   b) determining if the first telephony device is associated with a first multimedia client;
   c) obtaining a first address associated with the first multimedia client from a first service node based on the first telephone number;
   d) determining if the second telephony device is supported by the first service node;
   e) if the second telephony device is not supported by the first service node, routing call signaling for the voice call to a first call server, which controls a trunk gateway interfacing with a packet network; and f) establishing a voice connection for the voice call to the trunk gateway.

2. The method of claim 1 further comprising routing the call signaling for the voice call to a public switched telephone network if the first telephony device is not associated with the first multimedia device.

3. The method of claim 1 further comprising when the second telephony device is supported by the first service node:
   a) determining if the second telephony device is associated with a second multimedia client;
   b) routing the call signaling for the voice call to the first call server when the second telephony device is associated with the second multimedia client; and
   c) routing the call signaling for the voice call to a public switched telephone network if the second telephony device is not associated with the second multimedia device.

4. The method of claim 3 further comprising accessing a local number portability server to determine if the second telephony device is associated with the second multimedia client.

5. The method of claim 1 further comprising:
   a) receiving the first telephone number and the first address for the first multimedia client associated with the first telephony device at a second call server supporting the second telephony device;
   b) sending the second telephone number, first address, and first telephone number from the second call server to a second service node, which will identify a second address for a second multimedia client associated with the second telephony device based on the second telephone number; and
   c) sending the first address from the second service node to the second multimedia client using the second address.

6. The method of claim 5 further comprising sending the second address from the second multimedia client to the first multimedia client using the first address, such that either of the first or second multimedia clients can initiate a media session with the other.

7. The method of claim 1 where the second telephone number is associated with a plurality of telephony devices, including the second telephony device, supported by a public branch exchange (PBX), the second telephony device having an extension number, the method further comprising:
   a) receiving the first telephone number and the first address for the first multimedia client associated with the first telephony device at a second call server associated with the PBX;
   b) connecting the voice call to an attendant, which will recover the extension number for the second telephony device;
   c) sending the extension number, first address, and first telephone number from the second call server to a second service node, which will identify a second address for a second multimedia client associated with the second telephony device based on the extension number; and
   d) sending the first address from the second service node to the second multimedia client using the second address.

8. The method of claim 7 further comprising sending the second address from the second multimedia client to the first multimedia client using the first address, such that either of the first or second multimedia clients can initiate a media session with the other.

9. The method of claim 7 further comprising establishing a voice connection between the first and second telephony devices.

10. The method of claim 7 wherein the second call server is integrated with the PBX.

11. The method of claim 7 wherein the second call server is separate from the PBX.

12. A method for associating multimedia clients with telephony devices comprising:
   a) receiving from a first telephony device having a first telephone number a second telephone number associated with a second telephony device to initiate a voice call from the first telephony device to the second telephony device;
   b) routing call signaling for the voice call to a telephony switch supporting the second telephony device;
   c) determining if the first telephony device is associated with a first multimedia client;
   d) determining if the second telephony device is supported by a service node supporting the first telephony device;
   e) if the second telephony device is supported by the service node, sending the first and second telephone numbers from the telephony switch to the service node, which will provide a first address associated with a first multimedia client based on the first telephone number and a second address for a second multimedia client based on the second telephone number; and
   f) sending the first address to the second multimedia client using the second address.

13. The method of claim 12 further comprising establishing a voice connection between the first and second telephony devices.

14. The method of claim 12 further comprising accessing a local number portability server to determine if the second telephony device is associated with the second multimedia client prior to routing the call signaling for the voice call to the telephony switch.

15. A method for associating multimedia clients with telephony devices comprising:
   a) routing a voice call from a first telephony device associated with a first multimedia client to a second telephony device associated with a second multimedia client, the first telephony device associated with a first telephone number and the second telephony device associated with a second telephone number;
   b) obtaining a first address associated with the first multimedia client from a first service node based on the first telephone number;
   c) determining if the second telephony device is supported by the first service node;
   d) if the second telephony device is not supported by the first service node, sending a second service node the first address and the second telephone number;
   e) identifying a second address associated with the second multimedia client at the second service node based on the second telephone number; and
   f) sending the first address to the second multimedia client using the second address.

16. The method of claim 15 further comprising sending the second address from the second multimedia client to the first multimedia client using the first address, such that either of the first or second multimedia clients can initiate a media session with the other.

17. The method of claim 15 further comprising establishing a voice connection between the first and second telephony devices.

18. The method of claim 17 further comprising accessing a local number portability server to determine if the second telephony device is associated with the second multimedia client.

19. The method of claim 15 further comprising determining if the first telephony device is associated with the first multimedia client.

20. The method of claim 19 further comprising routing call signaling for the voice call to a first call server if the first telephony device is associated with the first multimedia client.

21. The method of claim 20 further comprising routing the call signaling for the voice call to a public switched telephone network if the first telephony device is not associated with the first multimedia client.

22. The method of claim 15 further comprising determining if the second telephony device is supported by the first service node and routing call signaling for the voice call to a first call server when the second telephony device is not supported by the first service node.

23. The method of claim 22 further comprising when the second telephony device is supported by the first service node:
   a) determining if the second telephony device is associated with the second multimedia client;
   b) routing the call signaling for the voice call to the first call server when the second telephony device is associated with the second multimedia client; and
   c) routing the call signaling for the voice call to a public switched telephone network if the second telephony device is not associated with the second multimedia client.

24. A system for associating multimedia clients with telephony devices comprising a telephony switch supporting a first telephony device and adapted to:
   a) receive from the first telephony device having a first telephone number a second telephone number associated with a second telephony device to initiate a voice call from the first telephony device to the second telephony device;
   b) determine whether the first telephony device is associated with a first multimedia client;
   c) obtain a first address associated with the first multimedia client from a first service node based on the first telephone number;
   d) determine if the second telephony device is supported by the first service node;
   e) if the second telephony device is not supported by the first service node, route call signaling for the voice call to a first call server, which controls a trunk gateway interfacing with a packet network; and
   f) establish a voice connection for the voice call to the trunk gateway.

25. The system of claim 24 wherein the telephony switch is further adapted to route the call signaling for the voice call to a public switched telephone network if the first telephony device is not associated with the first multimedia client.

26. The system of claim 24 wherein when the second telephony device is supported by the first service node, the telephony switch is further adapted to:
   a) determine if the second telephony device is associated with the second multimedia client;
   b) route the call signaling for the voice call to the first call server when the second telephony device is associated with the second multimedia client; and
   c) route the call signaling for the voice call to a public switched telephone network if the second telephony device is not associated with the second multimedia client.

27. The system of claim 26 further comprising accessing a local number portability server to determine if the second telephony device is associated with the second multimedia client.

28. The method of claim 1, wherein the first call server is a SIP call server.

29. The method of claim 5, wherein the second call server is a SIP call server.

30. The method of claim 20, wherein the first call server is a SIP call server.

31. The system of claim 24, wherein the first call server is a SIP call server.

32. The method of claim 1, wherein the receiving step occurs at a telephony switch supporting the first telephony device, and steps (b)-(f) are performed at least in part by the telephony switch.

33. The method of claim 12, wherein the receiving step occurs at a telephony switch supporting the first telephony device, and steps (b)-(f) are performed at least in part by the telephony switch.

34. The method of claim 15, wherein steps (a)-(f) are performed at least in part by a telephony switch.

* * * * *